Nov. 27, 1962 H. W. VOGTMANN 3,066,288
RESOLUTION OF AMBIGUOUS RANGE IN MTI RADAR
Filed May 19, 1958 4 Sheets-Sheet 1

INVENTOR.
HENRY W. VOGTMANN
BY Killman and Kerst
ATTORNEY

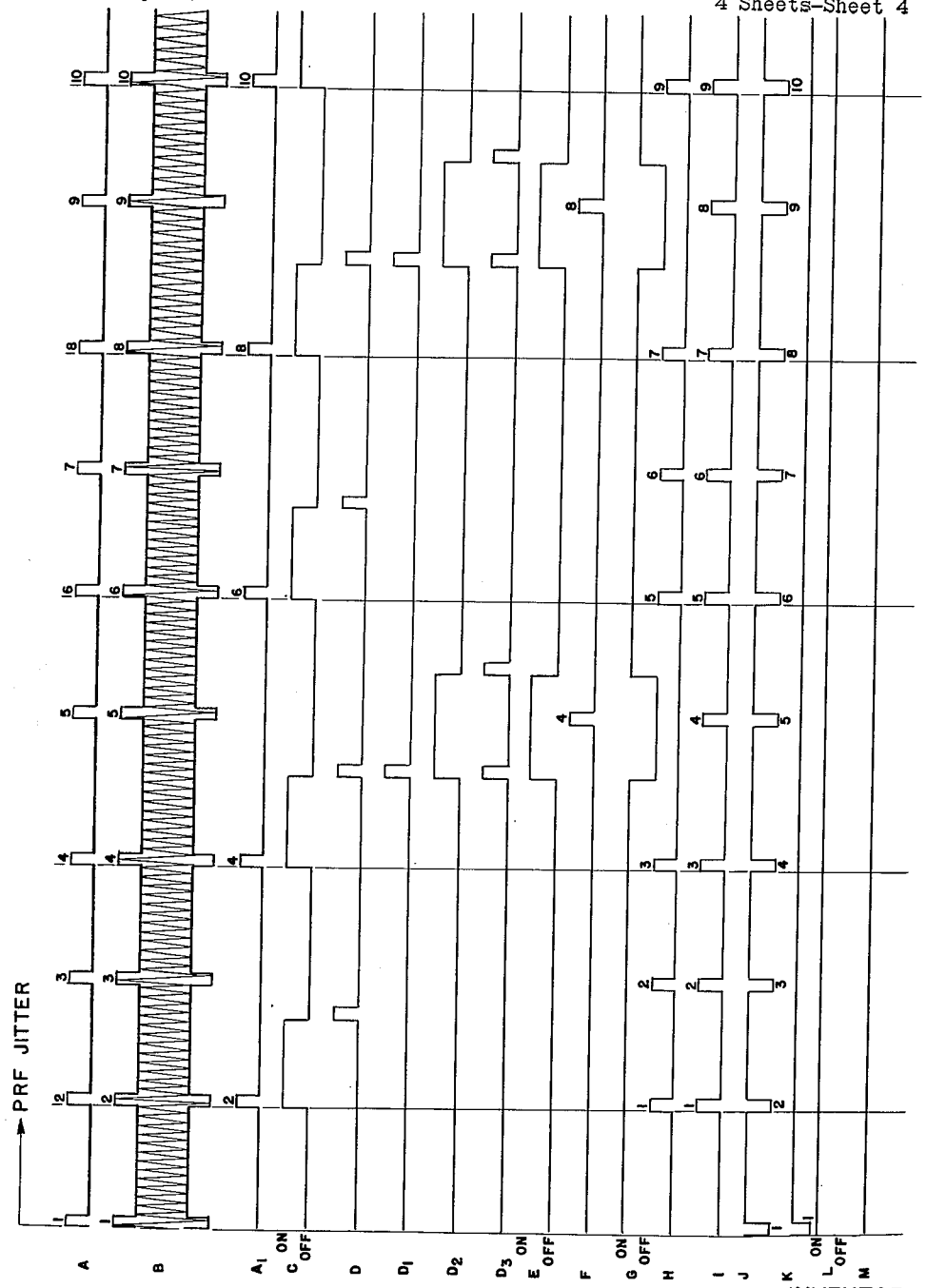

United States Patent Office 3,066,288
Patented Nov. 27, 1962

3,066,288
RESOLUTION OF AMBIGUOUS RANGE
IN MTI RADAR
Henry William Vogtmann, South Bend, Ind., assignor to
The Bendix Corporation, a corporation of Delaware
Filed May 19, 1958, Ser. No. 736,292
6 Claims. (Cl. 343—7.7)

This invention relates generally to radar systems and more particularly to moving target indicator (MTI) type radars wherein a visual presentation of moving targets is presented on an indicator such as a cathode-ray tube while stationary target signals are eliminated.

Moving target indicator (MTI) radar has come into wide application in both military and commercial applications particularly in relation to aircraft surveillance and control applications. The trend in radar equipment and ancillary beacon equipment is toward ever greater radiated power for increasing the range and reliability of the information gathered by the system while the pulse repetition frequency of such radars are limited by many other considerations such as the techniques employed to obtain the MTI display. For such equipment the problem of returns from targets beyond the nominal range dictated by the pulse repetition frequency results in an inherent range ambiguity which can be of serious consequence under any condition and particulary so if the information obtained from the radar is used as a basis for guidance and control of aircraft. Prior art arrangements employed to overcome or minimize the problem of second time around echoes cannot be directly applied to MTI equipment or leave much to be desired and seriously compromise the ability of the equipment to function efficiently under poor propagation conditions by reducing the probability of detection within the normal range coverage area. Other arrangements involve numerous added circuits which complicate the maintenance problem and reduce the reliability of the equipment.

It is a primary object of the present invention to obviate the shortcomings of the prior art and provide a MTI radar system which provides for simple and reliable identification of ambiguous range presentations.

A further object of this invention is to provide an improved MTI radar system in which second time around echoes can be identified selectively at the will of the operator.

It is a further object of this invention to provide in an MTI radar a simple arrangement for identifying ambiguous range presentations which will not materially alter the normal operation of the radar in the event of malfunctioning of the additional circuits.

Figure 1:
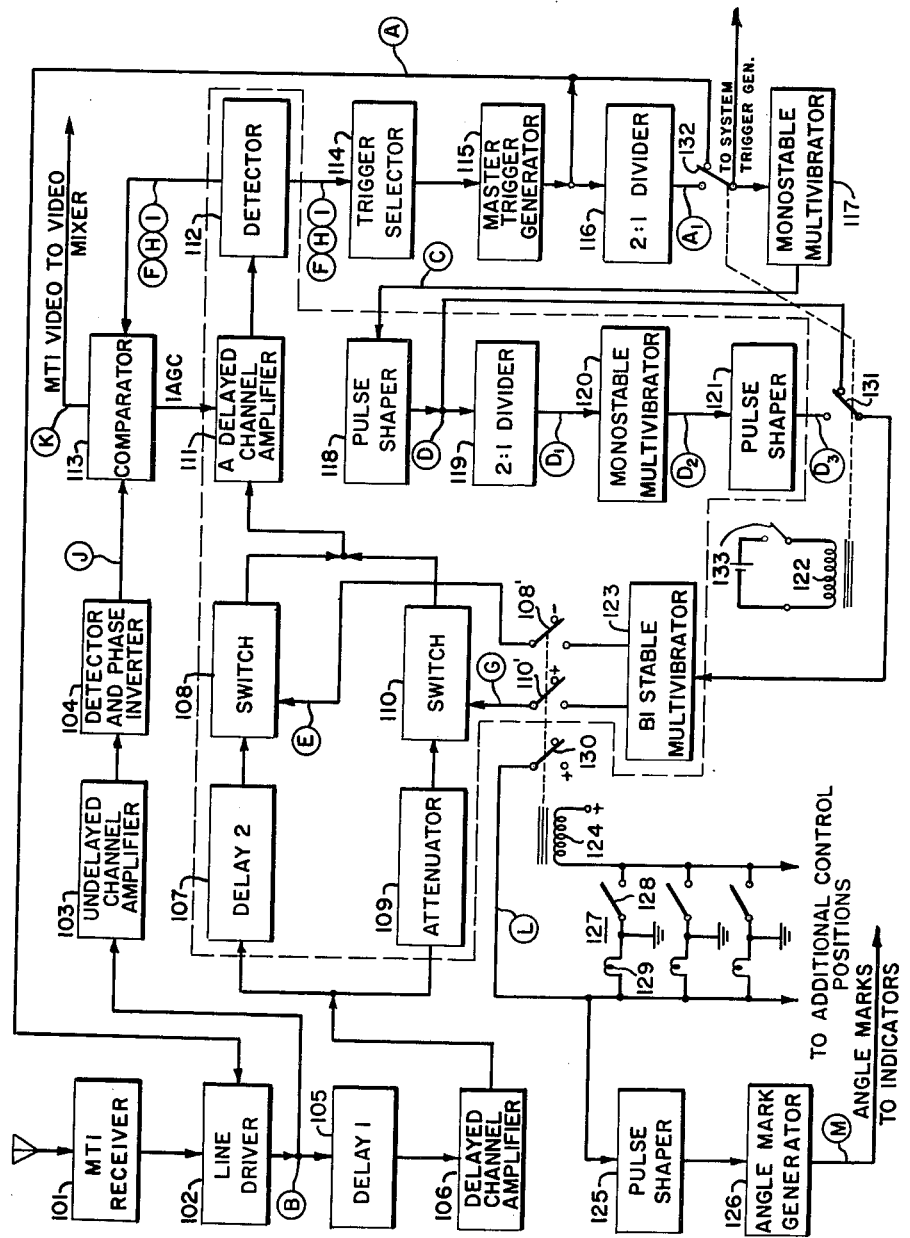
Figure 2:
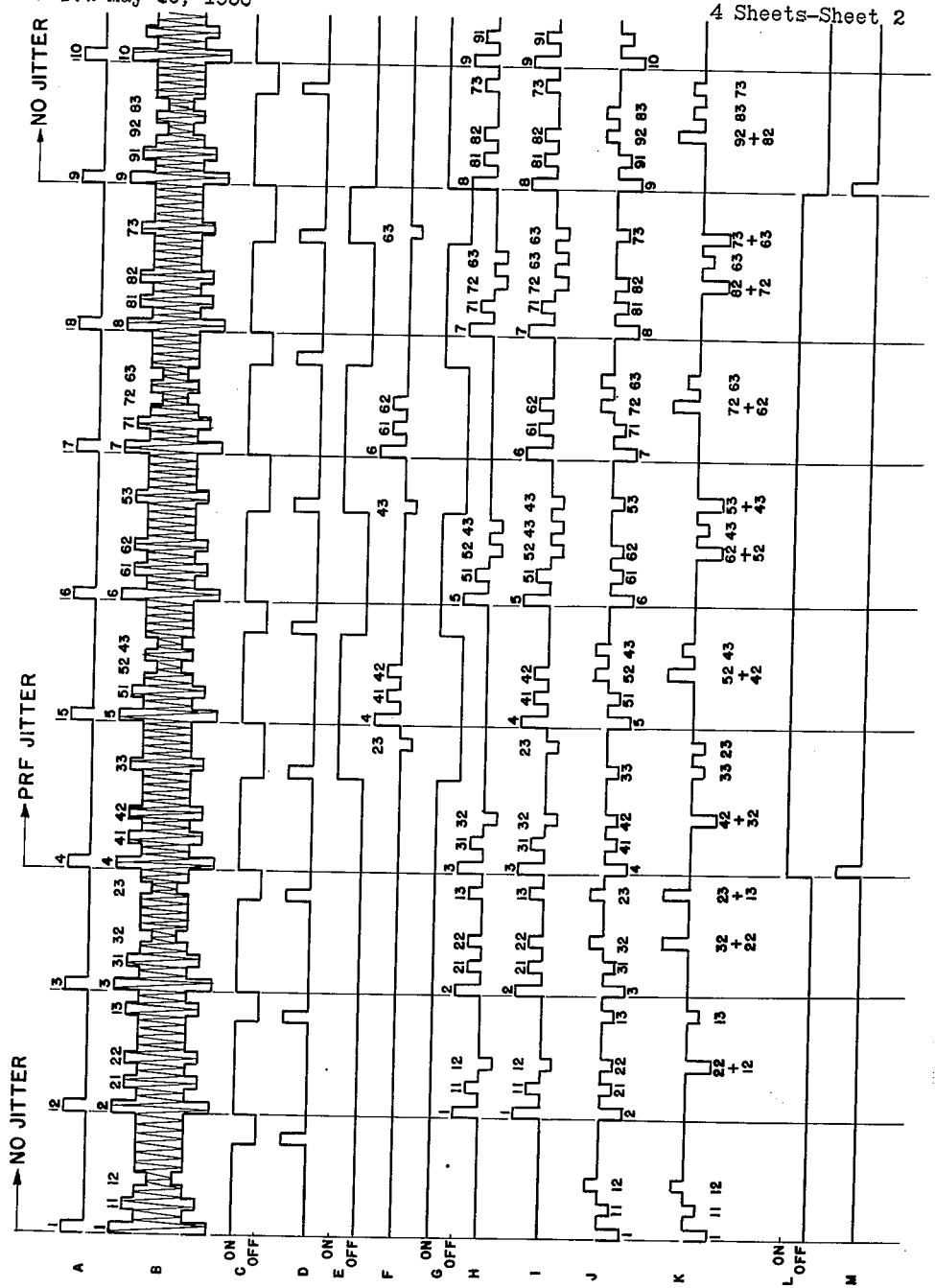
Figure 3:
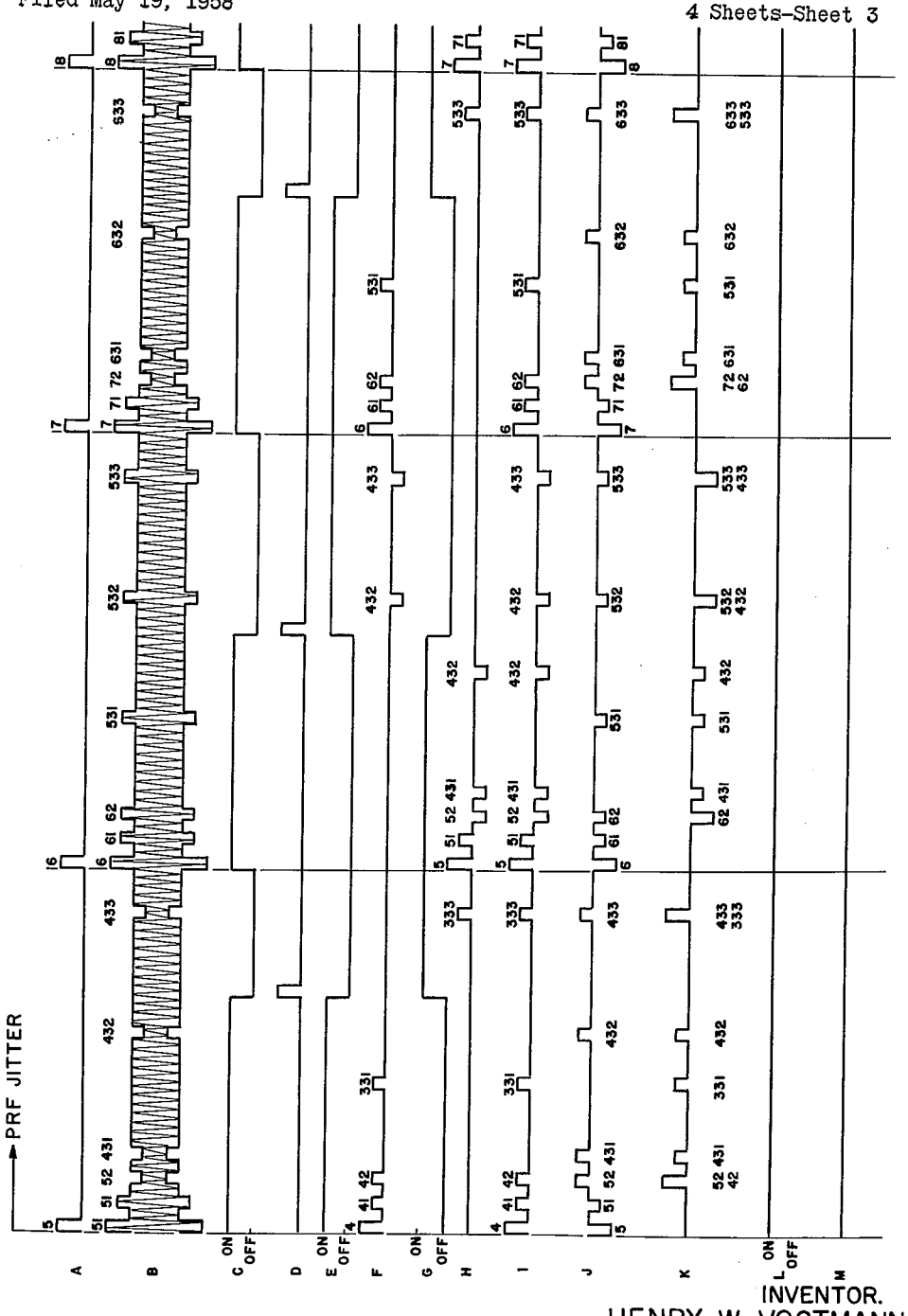

These and other objects of the present invention will become apparent from the following detailed description taken in conjunction with the accompanying drawings wherein:

FIG. 1 is a block diagram of an MTI radar system incorporating the present invention with the additional elements provided by this invention enclosed within the dotted boundary; and FIGS. 2, 3 and 4 are waveform diagrams for describing the operation of the invention.

The present invention provides for the identification of ambiguous range presentation in an MTI radar by providing at each operator's station a selective means for changing the characteristics of the pulse repetition frequency (PRF) of the radar. This change in PRF is accomplished in a manner which is compatible with the MTI system to provide the operator with means for selectively identifying echo indications as being within the normal range of the radar or outside the normal range as a result of echoes returning during a sweep of the range indicator subsequent to that corresponding to the transmitted pulse which produced the echo.

Referring now to FIG. 1, an MTI system is shown including a conventional MTI receiver 101 providing output signals consisting of coherent video representing fixed and moving target information as is well known in the art. The output of the receiver 101 is supplied to a line driver 102 which provides means for modulating the coherent video information and a trigger timing pulse on a carrier suitable for use in transmission through a delay line 105. The output of the line driver is also supplied directly to an undelayed channel amplifier 103 which increases the signal level sufficiently to operate a detector and phase inverter circuit 104. The signal from the undelayed amplifier channel 103 after passing through the detector and phase inverter 104 is converted into a train of video pulses of polarity dependent upon the polarity of the input pulses fed into the line driver 102 and 180° out of phase therewith. The output from the detector 104 provides the output signal of the undelayed channel of the MTI system.

Signals from the line driver 102 after passing through delay device 105 are applied to a delay channel amplifier 106. The delay device 105 may be a conventional delay line as employed in MTI systems for introducing delay equal to the desired pulse repetition interval of the system. The amplifier 106 provides sufficient amplification to make up for the losses in the delay line 105 and the output of amplifier 106 is fed to the input circuits of a delay device 107 and an attenuator 109. The delay device 107 may be a delay line or other suitable device for introducing a small delay of the order, for example, of that which would correspond to ten miles of radar range. The attenuator introduces a loss corresponding to the loss which is introduced by the delay 107 but without introducing any time delay in the channel which includes the attenuator 109. The outputs of the delay device 107 and the attenuator 109 are applied to respective switch amplifiers 108 and 110 which are signal controlled to pass the signals or to block the passage of signals thereto in accordance with a control signal which is applied to the switching amplifiers 108 and 110 in a manner which will be described hereinafter. The outputs of both amplifiers 108 and 110 are connected to the input of an amplifier 111 having sufficient gain to compensate for the signal loss in the delay 107 or the attenuator 109. The output of amplifier 111 is fed to a detector 112 which is similar to the detector 104 but does not provide for phase inversion as does the unit 104. The circuit from the output of the line driver 102, through the delay line 105, amplifier 106 and the parallel circuits of delay device 107 and attenuator 109, switches 108 and 110 and the delay channel amplifier 111 to the detector 112 comprise the delayed channel of the MTI system.

The output of the detector 112 as well as the output of detector 104 are applied to a comparator circuit 113 in accordance with conventional practice where signals from fixed targets tend to be cancelled while signals from moving targets are supplied at the output of the comparator 113 as MTI video. The average levels of the two input signals of the comparator 113 are also compared and used to generate a voltage suitable for instantaneous automatic gain control of the amplifier 111 so that small changes in gain of the delayed and undelayed channels are compensated.

The output of detector 112 is supplied to a trigger selector 114 which is biased in amplitude and time for selection of only the recirculating trigger video pulse. This pulse is fed by the selector 114 to a master trigger generator 115 the output of which is applied to the line driver 102 to introduce into the system the recirculating trigger pulse to sustain the pulse repetition frequency in accordance with well known MTI practice. For normal range with normal PRF of the radar system the output of master trigger generator 115 is applied to other system components such as the system trigger generator and also to a monostable multivibrator 117. The output of multivibrator 117 is supplied to pulse shaper 118 which provides, during the normal PRF of the system, a shaped pulse directly to a bistable multivibrator 123. The bistable circuit 123 is one well known in the art which switches between its two stable conditions for each input trigger pulse derived from the pulse shaper 118. The pulse derived from shaper 118 is of short duration and accurately timed to correspond with the trailing edge of the output pulse of the multivibrator 117 to thereby switch the bistable multivibrator 123 and produce an output consisting of two square wave trains which are 180° out of phase. The square wave trains derived from the output of the multivibrator 123 are of magnitude sufficient to effect switching when connected to the switching terminals of the amplifiers 108 and 110. The connection of the out of phase square waves from the multivibrator 123 to the switching inputs of amplifiers 108 and 110 is made selectively through the switching contacts 108′ and 110′ respectively.

Control of the switches 108′ and 110′ is provided by a suitable actuator such as a relay winding 124 which can be selectively energized from any one of a plurality of stations 127 to close the switches 108′ and 110′. The stations 127 are located adjacent the radar indicators for the various operators who are employed to observe and interpret the data on the radar indicator screen. Each of the stations 127 is provided with a switch 128 and a lamp 129 which is visible to the operator for indicating when any one of the operators has actuated his switch 128 for ambiguous target identification.

Also associated with relay 124 is a contact 130 which for the energized condition of the relay 124 is connected to a source of signals for application to a pulse shaper 125 which is connected to an angle mark generator 126. The angle mark generator 126 may be of any well known type and provides upon energization and deenergization of the relay 124 a radial angle mark on the radar indicator corresponding to the angular position of the antenna when the relay 124 is energized and deenergized respectively.

For operation of the radar system at longer than normal ranges a means is usually provided for selecting different pulse repetition frequencies as the normal pulse operating condition. The present invention provides for long range operation by doubling the pulse repetition interval which is accomplished by energizing a relay 122 upon closing switch 133. The relay 122 actuates switch contacts 131 and 132. When the relay 122 is energized the switch 132 changes the connection to the input of the multivibrator 117 from the output of master trigger generator 115 to the output of a two-to-one divider circuit 116. With this arrangement the recirculating trigger pulse from master trigger generator 115 back to line driver 102 remains unchanged but for every two such trigger pulses the circuit 116 provides one output pulse. Every second trigger pulse, therefore, is applied to the multivibrator 117 and the system triggers when the relay 122 is energized.

In order that the operation of this invention may be obtained for long range operation with the two-to-one reduction in pulse repetition frequency it is necessary that only one out of every four circulating trigger intervals will be subjected to the delay device 107. To obtain this operation the relay 122 provides in its energized condition for the switch 131 to be disconnected from the output of pulse shaper 118. The pulse shaper 118 supplies its output to the input of a two-to-one divider 119 which drives a monostable multivibrator 120 which in turn drives a pulse shaper 121. The output of the pulse shaper 121 is connected by means of the switch 131 when relay 122 is energized to supply the input to the bistable multivibrator 123. For this arrangement with the low pulse repetition frequency selected by energizing the relay 122 an effective 4–1 count down has been introduced between the master trigger generator 115 and the bistable multivibrator 123 which provides the necessary switching output timed to correspond with the longer pulse interval for the long range condition of operation. A similar arrangement can be made to adapt radars having different high to low PRF ratios by duplicating this ratio in the count down or frequency divider circuits.

For the purposes of describing the invention with respect to the waveform diagrams shown in FIGS. 2, 3 and 4 the following tables are presented identifying in Table I the various waveforms and giving in Table II the pulse code scheme for identifying individual pulses in the waveforms in FIGS. 2 and 3.

*Table I*

Waveform:                                        Description

A _____ Circulating Trigger.
    B _____ Line Driver Output (Modulated Carrier).
    C _____ Output of Monostable Multivibrator. (Can be MTI Gate Gen.) 117.
    D _____ Timing Pulse Derived from Recovery 117—Trigger for 123.
    E _____ Switch Bias to 108.
    F _____ Detected Output (Delay 1) and (Delay 2).
    G _____ Switch Bias to 110.
    H _____ Detected Output (Delay 1 only).
    I _____ Combined F and H.
    J _____ Undelayed Video—Inverted.
    K _____ Combined I and J (MTI Video).
    L _____ System Signal Voltage.
    M _____ Angle Marks to PPI Indicators.
    $A_1$ _____ Master Trigger for Low PRF.
    $D_1$ _____ Output of Counter 119.
    $D_2$ _____ Output of 120.
    $D_3$ _____ Trigger for 123 Derived from Switching and Recovery of 120.

*Table II*

| Pulse Code No. | Code Definition |
| --- | --- |
| 1 through 10 | Circulating Trigger Pulses (A). |
| 11, 21, 31, 41, etc. | Fixed Target (coherent) Video Pulses. |
| 12, 22, 32, 42, etc. | Moving Target Video Pulses. |
| 13, 23, 33, 43, etc. | Ambiguous Range Target Video Pulses Being Observed in Subsequent Trigger Interval. |
| 431, 432, 433 | Same as Above but Showing Three Targets to Illustrate Operation Relating to Recovery Time of 117. |
| 531, 532, 533 | |
| 631, 632, 633 | |

NOTE.—In all pulse designations, the first digit identifies the parent trigger pulse. The second and third digits identify target information as follows:
    —1. Fixed Target Video
    —2. Moving Target Video
    —3. Ambiguous Range Video
    —31. Special Case of —3 inside 117 Late Time
    —32. Special Case of —3 Bracketed by 117 Time
    —33. Special Case of —3 Outside 117 Time Referring now to FIG. 2, a waveform diagram showing the operation of an MTI radar for both the normal operation and the operation which includes the PRF jitter introduced in accordance with the teaching of this invention is shown. The waveforms and the individual pulses within the waveforms are identified in accordance with the preceding tables and the code for identification of the pulses given therein. Waveform A shows the circulating trigger for ten pulse repetition periods numbered 1–10 which represent the normal timing control for the radar system. Pulses 1, 2 and 3 in waveform A occur at the normal repetition period of the radar system, while starting with pulse 4 and continuing through pulse 8, the radar is subject to the condition of PRF jitter as provided by the present invention upon closing one of the switches 128. Pulses 9 and 10 represent a return to the normal pulse repetition frequency. Waveform B shows the output of the line driver 102 and comprises the modulated carrier which contains the echo information gathered by the radar system. As identified in each pulse interval, pulses 11, 21, 31, etc. show pulse returns from a fixed target as they appear in the coherent video. Also contained in the video waveform B are the pulses 12, 22, 32, 42, etc. showing the waveform as it appears for a moving target with alternate reinforcement and cancellation between the returned echo and the coho to produce the well known fluctuating moving target video signal. Ambiguous pulses caused by second time around echoes which are to be identified by means of this invention as will presently be described are shown in the video waveform B as pulses 13, 23, 33, etc. It will be noted according to the pulse coding scheme of Table II that pulse 13 is made up of two digits 1 and 3; the 1 in the tens column identifying the echo as having been derived from the radiated pulse 1 and the 3 in the units column identifying the pulse 13 as being an ambiguous range echo.

The operation of the radar system provides waveform C, produced at the output of monostable multivibrator 117 with a predetermined time duration pulse following each of the trigger pulses A. This waveform C may be the MTI gate pulse for passing MTI signals for predetermined range. As the monostable multivibrator 117 reverts to its stable state, a pulse shaper 118 generates the waveform D, which for normal PRF is applied to the bistable multivibrator 123. The bistable circuit 123, when it is connected by means of contacts 108', 110' to the respective switch circuits 108 and 110, operates the switches 108, 110 alternately to pass video in the channels in which these circuit elements appear to produce ultimately the waveforms F and H. These two waveforms F and H are derived from the modulated video outputs from the switches 108, 110 which are combined at the input of amplifier 111 and applied to the detector 112 to produce waveform I. The undelayed video waveform J is applied to the comparator 113 as is the combined waveform I to produce the MTI video waveform K which is ultimately utilized to intensity modulate the indicator.

From an examination of the MTI video waveform K can be seen that the pulse 11 appearing in waveform I from a fixed target during the second sweep interval is combined with the pulse 21 in waveform J of opposite polarity during the second sweep interval to produce a zero output and completely cancel the returns from fixed targets. In the second and subsequent intervals the returns from moving targets are represented as the combination of pulses 12 and 22 in interval 2, and 22 and 32 in interval 3, with the combined pulses appearing in alternating polarities for successive intervals throughout the waveform diagram. This is the well known fluctuating MTI signal from moving targets which is utilized to actuate the indicator.

An examination of waveform K shows, during the pulse interval following pulse 4 in waveform A, that the ambiguous target pulses 33 and 23 are displayed as spaced individual pulses, while in the preceding pulse interval, pulses 13 and 23 combine at the same time to produce a higher amplitude pulse at the position corresponding to between pulses 23, 33 in the subsequent sweep. This alternate displacement in time of the return echo for an ambiguous target range is characteristic of the invention and enables the operators immediately to identify such echoes by selectively calling for resolution of the ambiguity by actuating an operator's switch 128.

A study of the waveforms in FIG. 2 will show that the individual pulses processed by the system are differently affected when they vary in time with respect to the trailing edge of waveform C. Since this waveform could be that of the MTI gate generator and hence variable in time, it will be useful to examine the condition which obtains when the ambiguous target echo assumes the three possible positions with respect to the trailing edge of the waveform C. For this purpose FIG. 3 has been drawn on an expanded scale to show the pulse intervals 5 to 8 as modified by the introduction of echo signals critically positioned with respect to the trailing edge of waveform C. The introduction of an echo signal 331, 431, 531, 631 falls within the "on" time of gating waveform C. An echo 432, 532, 632 is positioned in time so that it is alternately within the "on" and "off" time of waveform C as the circuit of the present invention alters the PRF by the amount of the jitter introduced by delay 107 and thus varies the time position of the trailing edge of waveform C. A third echo is introduced which first appears on waveform H as pulse 333 in a time position which keeps it at all times beyond the trailing edge of waveform C and thus never present during the "on" period of waveform C. It will be understood that the coding scheme of Table 2 has been continued in the pulses shown in FIG. 3 with the three digit pulses identified by means of the digit in the hundreds column showing the trigger waveform pulse of origin, the digit in the tens column identifying the pulse as being an ambiguous range target and the digit in the units column corresponding to the special cases represented by the three possible positions of the pulse with respect to the trailing edge of waveform C. From an examination of waveform K it can be seen that the combined pulses during the interval after pulse 5 in waveform A showing the combined pulses 333 and 433, appear at a time different from that of the combined pulses 433 and 533 during the subsequent pulse interval. For the three pulse intervals shown in FIG. 3 it can be seen that the successive combined pulses for the other two conditions of time occurrence of the echo with respect to the trailing edge of waveform C do not occur in space coincidence on successive sweeps. It can be seen that they are displaced in time sufficiently to produce an indication on the integrating display surface of an indicator tube. For example, for the three successive pulse intervals 5, 6 and 7 shown in FIG. 3, the pulses 431, 531 and 631 in the respective intervals are time displaced sufficiently to give an indication on the radar screen. Similarly, the pulses 432, 532 and 632 are displaced in time on their respective sweep to give an indication to resolve ambiguity in range. The pulses 331, 431, etc. falling within the "on" time of gating waveform C are not resolved in time between successive pulse intervals but for the jitter condition of operation the waveforms 331, 431, etc. are duplicated in space position on sweeps to give a unique, recognizable indication. Thus it can be seen that although the display in any one pulse interval will vary from that in an adjacent pulse interval for signals which vary with respect to the trailing edge of waveform C, the integrated display on a display tube will be capable of identification as to those echoes representing targets at ranges beyond the normal range of the radar.

The operation of the radar sysem for low pulse repetition frequencies to obtain information at extended ranges will now be described with respect to the waveforms of FIG. 4. For low PRF operation, the contacts 131 and 132 are changed to derive the waveform $A_1$ from the 2 to 1 divider 116 and to obtain the waveform $D_3$ from the pulse circuits 119, 120 and 121 for operating the multivibrator 123. These waveforms are all shown in FIG. 4. Since the MTI feature does not operate for the extended range condition, the video waveform as shown in waveform J provides the range information as to all targets. As can be seen by observing the spacing between pulses 2—3 and between pulses 4—5, etc. in waveform J, a displacement occurs on alternate sweep intervals of the position of target pulses 3, 5, 7, 9 with respect to the immediately preceding trigger pulses 2, 4, 6 and 8, respectively. This indication on the radar will resolve ambiguous targets as being second time around echoes for the low PRF operation.

Referring back to FIG. 2, the waveforms L and M show respectively the application of continuous square wave of current or voltage during the depression of one of the switches 128, which actuates the lamps 129 and provides an input signal to the pulse shaper 125. The output of the shaper 125 is applied to an angle mark generator 126 to generate waveform M at both the rising and falling wavefronts of the waveform L. In this manner the displays are identified with angle mark indications bracketing the ambiguous target which is being investigated on the face of the indicator tube.

While a specific embodiment of the invention as applied to a specific MTI radar has been disclosed, other equivalent modifications are possible within the spirit of the invention. For example, apparatus for obtaining the general operation and function performed to achieve the desired results can be readily designed by those skilled in the art to meet the requirements of any radar system. Other possibilities are obvious such as, for example, reversing the operation of relay 124 to obtain normal jitter operation with selective nonjitter operation available at will for identifying second time around echoes.

Many applications and modifications of the present invention will now be apparent to those skilled in the art and are to be considered within the scope of the invention as defined in the appended claims.

I claim:

1. In a periodic pulse radar system means for receiving echo signals from objects, an undelayed channel for said signals, a delayed channel including means for delaying said signals by the interval of the repetition period of said pulses, means for comparing the output signals of said channels to obtain combined signals representing moving objects, means for deriving control impulses synchronized in predetermined relation with said repetition period, a bistable multivibrator responsive to said control impulses to generate phase opposed square waves synchronized with said impulses, an incremental delay device providing electrical delay short in comparison to said period, a pair of switching devices for alternatively providing a signal passing and signal blocking condition, circuit means for applying the signals in one of said channels to both of said switching devices, circuit means connecting one of said switching devices in series with said incremental delay device, manually operated means for selectively connecting said phase opposed square waves for operating said switching devices to alternately pass and block signal transmission thereby, said manually operated means providing alternative connections to said switching devices to maintain them in fixed opposite signal transmission condition.

2. A system according to claim 1 including means for operating at extended range comprising means for increasing the pulse interval by a predetermined factor whereby the period of said control impulses is increased by the same factor, and means interposed between said bistable multivibrator and said control impulse means to trigger said multivibrator at a period increased by said factor over the increased period of said control impulses.

3. Apparatus according to claim 2 and including a plurality of indicator stations for displaying information contained in said echo signals, and manually operable means at each of said stations for actuating said selectively actuable means.

4. Apparatus according to claim 3 in which said indicators are plan position indicators and including an angle mark generator operative to produce an angle bearing indication on said indicators upon operation of said manually operable means.

5. A periodic pulse radar system comprising, a radar receiver for receiving echo signals from fixed and moving objects, amplifying means for amplifying signals from said receiver, a detector for detecting signals from said amplifying means, a first signal delay device for delaying signals from said receiver and recirculating trigger pulses to establish the period of said pulses, an amplifier for the delayed signals from said device, an incremental delay device for delaying said delayed signals an additional amount small in comparison to said first delay device, a pair of switch means electrically operable into one of two conditions to pass or block signals, circuit means for applying said delayed signals in succession to said incremental delay device and one of said switch means, circuit means for applying said delayed signals to said other switch means, circuit means including a detector for combining and detecting the outputs of both said switch means, a comparator for combining the outputs of both said detectors in phase relation to tend to cancel echo signals from fixed objects, means for applying the output of said comparator to the video channel of a radar, means for selecting trigger pulses from the output of said detector of delayed signals from said switch means, means for coupling said trigger pulses to the input of said first delay device, means responsive to said trigger pulses for generating a delay gate, a bistable multivibrator, means for switching said multivibrator between stable states in response to said delay gate and means for selectively connecting said multivibrator to said switches such that when connected said switches are in unlike conditions of signal transmission and both alternate with the change of state of said multivibrator, said selective means providing fixed unlike conditions of said switches when said multivibrator is not connected to said switches.

6. Apparatus according to claim 5 including means for operating said radar at extended range comprising selective means for introducing a pulse frequency divider of fixed ratio between said trigger pulse selecting means and said delay gate generator, and means for introducing a second pulse frequency divider of the same ratio between said delay gate generator and said bistable multivibrator.

References Cited in the file of this patent

UNITED STATES PATENTS

| | | |
|---|---|---|
| 2,452,598 | Page | Nov. 2, 1948 |
| 2,746,033 | Bachman | May 15, 1956 |
| 2,991,467 | Clarke | July 4, 1961 |